United States Patent
Celle et al.

(10) Patent No.: US 10,422,577 B2
(45) Date of Patent: Sep. 24, 2019

(54) OVEN FOR MANUFACTURING A MINERAL WOOL PRODUCT

(71) Applicant: Saint-Gobain Isover, Courbevoie (FR)

(72) Inventors: Pierre Celle, Paris (FR); Bernard Baudouin, Rantigny (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 208 days.

(21) Appl. No.: 15/583,578

(22) Filed: May 1, 2017

(65) Prior Publication Data

US 2017/0234616 A1    Aug. 17, 2017

Related U.S. Application Data

(62) Division of application No. 14/367,567, filed as application No. PCT/FR2012/053004 on Dec. 19, 2012, now Pat. No. 9,664,443.

(30) Foreign Application Priority Data

Dec. 20, 2011 (FR) ...................................... 11 62034

(51) Int. Cl.
    B29C 35/06     (2006.01)
    D04H 3/004     (2012.01)
    (Continued)

(52) U.S. Cl.
    CPC ............ F26B 3/06 (2013.01); B29C 35/0277 (2013.01); B29C 35/045 (2013.01); B29C 35/06 (2013.01);
    (Continued)

(58) Field of Classification Search
    CPC ... B29C 35/0277; B29C 35/04; B29C 35/045; B29C 35/06; B29C 67/248;
    (Continued)

(56) References Cited

U.S. PATENT DOCUMENTS 3,096,161 A    7/1963 Morrison
3,234,041 A    2/1966 Rosecrans
(Continued)

FOREIGN PATENT DOCUMENTS

CN    101688756 A    3/2010
EP    0 000 111 A1    12/1978
(Continued)

OTHER PUBLICATIONS

International Search Report issued in PCT/FR2012/053004 dated May 27, 2013.
(Continued)

Primary Examiner — Michael A Tolin
(74) Attorney, Agent, or Firm — Oblon, McClelland, Maier & Neustadt, L.L.P.

(57) ABSTRACT

An oven for baking a thermally curable binder in a mat of mineral fibers, including plural compartments through which the mat of fibers passes successively, the mat being compressed and transported through the compartments by gas-permeable upper conveyors and lower conveyors, each compartment having a length along a direction of movement of the mat and including a mechanism introducing a hot air flow, located either below or above the fiber mat, and a mechanism extracting the air after having passed through the mat, respectively arranged either above or below the opposite face of the mat, so that the binder is progressively brought to a temperature higher than its curing temperature. In one compartment the mechanism introducing hot air includes air inlets that open partly on openings formed on a first lateral side of the compartment and partly on openings formed on the opposite lateral side of the compartment.

13 Claims, 8 Drawing Sheets

(51) Int. Cl.
  *F26B 3/06*    (2006.01)
  *F27B 9/10*    (2006.01)
  *F27B 9/30*    (2006.01)
  *B29C 35/02*   (2006.01)
  *B29C 67/24*   (2006.01)
  *F27B 9/24*    (2006.01)
  *B29C 35/04*   (2006.01)
  *B29C 37/00*   (2006.01)
  *F26B 13/10*   (2006.01)
  *F26B 13/16*   (2006.01)

(52) U.S. Cl.
  CPC ........ *B29C 37/0064* (2013.01); *B29C 67/248* (2013.01); *B29C 67/249* (2013.01); *D04H 3/004* (2013.01); *F26B 13/108* (2013.01); *F26B 13/16* (2013.01); *F27B 9/10* (2013.01); *F27B 9/243* (2013.01); *F27B 2009/3016* (2013.01)

(58) Field of Classification Search
  CPC .. B29C 67/249; D04H 1/4209; D04H 1/4218; D04H 1/4226; D04H 1/58; D04H 1/645; D04H 3/002; D04H 3/004; D04H 3/12; F26B 3/06; F26B 13/101; F26B 13/108; F26B 13/16; F26B 17/026; F27B 9/10; F27B 9/243; F27B 9/3005; F27B 9/3011; F27B 2009/3016
  See application file for complete search history.

(56) References Cited

U.S. PATENT DOCUMENTS

| 4,028,051 | A  | 6/1977  | Lundstrom     |
| 4,263,007 | A  | 4/1981  | Battigelli    |
| 4,825,561 | A  | 5/1989  | Cornell       |
| 4,831,746 | A  | 5/1989  | Kim et al.    |
| 5,156,545 | A  | 10/1992 | Deblock et al.|
| 5,227,175 | A  | 7/1993  | Reinbold      |
| 5,319,862 | A  | 6/1994  | Ohgihara      |
| 8,808,443 | B2 | 8/2014  | Jaffrennou    |

FOREIGN PATENT DOCUMENTS

| JP | 6-28593 U         | 4/1994  |
| KR | 10-2011-0056512 A | 5/2011  |
| WO | 90/11482 A1       | 10/1990 |

OTHER PUBLICATIONS

Chinese Search Report issued in Application No. 201280063356.9 dated Jun. 9, 2015.

OVEN FOR MANUFACTURING A MINERAL WOOL PRODUCT

This application is a division of U.S. application Ser. No. 14/367,567 filed Jun. 20, 2014, now U.S. Pat. No. 9,664,443, the entire contents of which is incorporated herein by reference. U.S. application Ser. No. 14/367,567 is a 371 of International Application No. PCT/FR12/053004 filed Dec. 19, 2012, and claims the benefit of priority from prior French Application No. 11 62034 filed Dec. 20, 2011.

The invention relates to the field of products such as panels, rollers or shells based on mineral fibers such as glass fibers or stone fibers. It applies more particularly to the manufacture of acoustic and/or thermal insulation products in particular for buildings. More precisely, the present invention relates to the ovens used for obtaining such products.

The insulation products currently marketed consist of a mat of mineral fibers, such as glass fibers bound together by an organic binder.

The manufacture of such mats of inserting fibers primarily comprises fibering and the deposition of fibers on a perforated conveyor or mobile transporter. The mass of newly formed fibers is pressed onto the conveyor with the aid of suction compartments arranged under the transporter on which the fibers are arranged. During the fibering, a binder is sprayed in the state of a solution or suspension in a volatile liquid such as water onto the stretched fibers, this binder having adhesion properties and usually comprising a heat-curable material, such as a thermally curable resin, most often until recently a phenol/formaldehyde resin.

The primary layer of relatively loose fibers on the collector conveyor is then transferred to a heating device, commonly referred to in the field as a crosslinking oven. The fiber mat passes through the entire length of the oven by virtue of additional perforated conveyors. These are often two endless conveyors facing one another and spaced apart by a distance adjusted in order to determine the thickness of the mat which is formed. Each branch of the conveyors is furthermore constructed from pallets consisting of mutually articulated grilles which are perforated in order to be permeable to air and the other gases resulting from heating the mat. Such a mat thus has a greater or lesser density depending on the degree of compression exerted by the two transporters in the oven.

During its passage through the oven, the mat is dried and subjected to a specific heat treatment, which causes curing of the binder present on the surface of the fibers. This curing also leads to crosslinking of the fibers with one another in a three-dimensional structure (that is to say a bond via the thermally cured binder to the points of contact between the fibers) and thus to stabilization and elasticity of the mat with the desired thickness, whether under the effect of flexion or compression.

The operating mode used in order to bring about curing of the binder consists in passing heated air through the mat, so that the binder present throughout the thickness of the mat is progressively heated to a temperature higher than its curing temperature. To this end, the crosslinking oven is composed of a housing constituting a closed chamber in which a series of compartments, supplied by burners with hot air circulated by fans, are arranged. Each compartment thus defines an independent heating zone, in which specific heating conditions are regulated. The compartments are separated by walls having openings for the mat and the upper and lower conveyors. The use of a plurality of compartments thus allows graded elevation of the temperature of the mat throughout its passage through the oven, and thus avoids the occurrence of hot spots due to locally excessive heating, or alternatively the presence in the mat of regions in which the binder has not been thermally cured fully. An oven used in the mineral wool manufacturing process thus very often comprises a multiplicity of compartments (for example between 3 and 10), as well as known means for establishing variable thermal conditions within each compartment. It is then possible to regulate the temperature rise of the mat in the succession of baking stages, over the path of the mat through the oven. Examples of such ovens are described, in particular, in the publications EP 000111A1, EP 619465.1 or WO2008/119778, to which reference may be made for further information. In a conventional crosslinking oven, such as is illustrated in FIG. 2 of the application EP 000111 or FIGS. 23 and 5 of the application EP 619465, the means for introducing hot air are arranged on the same single side of the compartments, the extraction of the gases after it has passed through the mat taking place on the same side of said compartment. An alternative embodiment consists in extracting the air on the opposite side.

Currently, the use of new alternative binders, as a replacement for formophenolic resins, makes it very difficult to control the conditions of the fiber mat baking process in a conventional oven as described above. Such binders, sometimes referred to as "green binders", particularly when they are obtained from a renewable, in particular plant source, in particular of the type based on hydrogenated or non-hydrogenated sugars, for example, as described in the applications WO 2009/080938 and WO 2010/029266, most often require very good regulation of the baking temperatures in order to reach the thermally cured state, the range of baking temperatures being narrower. More particularly, the binder must be subjected to a temperature lying between a minimum in order to achieve its curing and a maximum above which it degrades rapidly, which ultimately leads to degraded mechanical properties of the final product, even after its installation. The difference between the minimum and maximum may be of the order of only 20° C., or less, depending on the type of green binder. Control of the temperature throughout the thickness of the fiber mat therefore requires new techniques, and in particular changes in the actual design of the ovens.

It is thus the object of the present invention to respond to the aforementioned problems and, in particular, to provide an oven which is configured in order to regulate the baking temperature "seen" by the thermally curable binder more precisely, at any point in the fiber mat and throughout its thickness. In particular, such regulation may be obtained according to the invention by better control of the vertical passage speeds through the fiber mat of the hot air flows used in order to adjust said temperature. Thus according to the invention, it has been observed that great homogeneity of said vertical speed of the gases when passing through the mat leads to improved control of its final properties. More particularly, contrary to the received opinion as implemented in the prior publications mentioned above, the studies carried out by the applicant company have shown that greater homogeneity of said speeds is highly dependent on the location of the points of introduction of the hot gases within the oven, and particularly within each of its successive constituent compartments.

More precisely, the present invention relates to an oven for baking a thermally curing binder present in a mat of mineral fibers, comprising a series of compartments through which said mat of fibers passes successively, said mat being compressed and transported through said compartments by gas-permeable upper conveyors and lower conveyors. Each compartment has a length L along the direction of movement of the mat and comprises means for introducing a hot air flow, which means are located either above or below said fiber mat, and means for extracting the air after it has passed through the mat, which means are respectively arranged either below or above the opposite face of said mat, so that the binder is progressively brought to a temperature higher than its curing temperature. Said oven has at least one compartment in which said means for introducing hot air comprise air inlets opening partly on openings formed on a first lateral side of said compartment and partly on openings formed on the opposite lateral side of said compartment.

According to particular and preferred embodiments of the invention, which may optionally be combined with one another:

Said means for extracting the air after it has passed through the mat comprise air outlets opening partly on openings formed on the first lateral side and partly on openings formed on the opposite lateral side of said compartment.

Along the direction given by the length L of said compartment or compartments, the openings formed for the air inlets on the first side are arranged substantially facing the openings formed for the air inlets on the opposite side.

Along the direction given by the length L of said compartment or compartments, the openings formed for the air inlets on a first side and the openings formed for the air inlets on the opposite side are offset.

Along the direction given by the length L of said compartment or compartments, the openings on the first side and the openings on the opposite side have an overlap region of between 5 and 30% of the length L, in particular between 10 and 20% of the length L.

Alternatively, along the direction given by the length L of said compartment or compartments, the openings on the first side and the openings on the opposite side do not have an overlap region.

Along the direction given by the length L of said compartment or compartments, the openings formed for the air inlets on the two sides are offset and are arranged:
  on a first side: from a first end of the length of the compartment toward the opposite end of the compartment, over a portion of less than 80% of said length, preferably over a portion of less than 60% of said length and highly preferably over a portion of less than 50%,
  on the opposite side: from the opposite end of the length of the compartment toward the other end, over a portion of less than 80% of said length, preferably over a portion of less than 60%, and highly preferably over a portion of less than 50% of said length, Along the direction given by the length L of said compartment or compartments, the openings formed on a first side extend from a first end to the center of said by compartment, and wherein the openings formed on the opposite side extend from the other end to the center of said compartment.

Along the direction given by the length L of said compartment or compartments, the openings formed for the extraction of air after it has passed through the mat of fibers are arranged above the air outlet openings.

Along the direction given by the length L of said compartment or compartments, the openings formed for the extraction of air after it has passed through the mat of fibers are offset with respect to the air inlet openings.

The present invention also relates to a compartment as described above.

Furthermore, the present invention also relates to a method for manufacturing a mat of mineral wool fibers, in particular glass wool fibers, comprising at least one step of fibering said fibers, onto which a solution of thermally curable binder is sprayed, and a step of heating the binder to a temperature making it possible to cure the binder, wherein said heating step is carried out by means of an oven as described above.

The invention finds its application particularly in a fibering method in which said binder is obtained from a plant source, in particular based on hydrogenated or non-hydrogenated sugars. According to an advantageous embodiment of such a method, hot air whose temperature lies between 200° C. and 250° C. may be injected into the oven.

The characteristics of the various embodiments will now be described with reference to the appended FIGS. 1 to 6. Clearly, these various embodiments are given only by way of illustration and in particular do not restrict the scope of the present in any of the aspects which will now be described.

FIG. 1 describes a current installation for fibering a glass wool product, into which the oven of the present invention may be introduced.

FIG. 2 schematically illustrates the operating principle of a comparative oven.

FIG. 3 gives a schematic representation of one of the constituent compartments of the oven according to FIG. 2

FIG. 4 schematically illustrates the operating principle of a compartment according to the first embodiment of the present invention.

FIG. 5 schematically illustrates the operating principle of a compartment according to a second embodiment of the present invention.

FIG. 6 schematically illustrates the operating principle of a compartment according to a third embodiment of the present invention.

Figure 1:
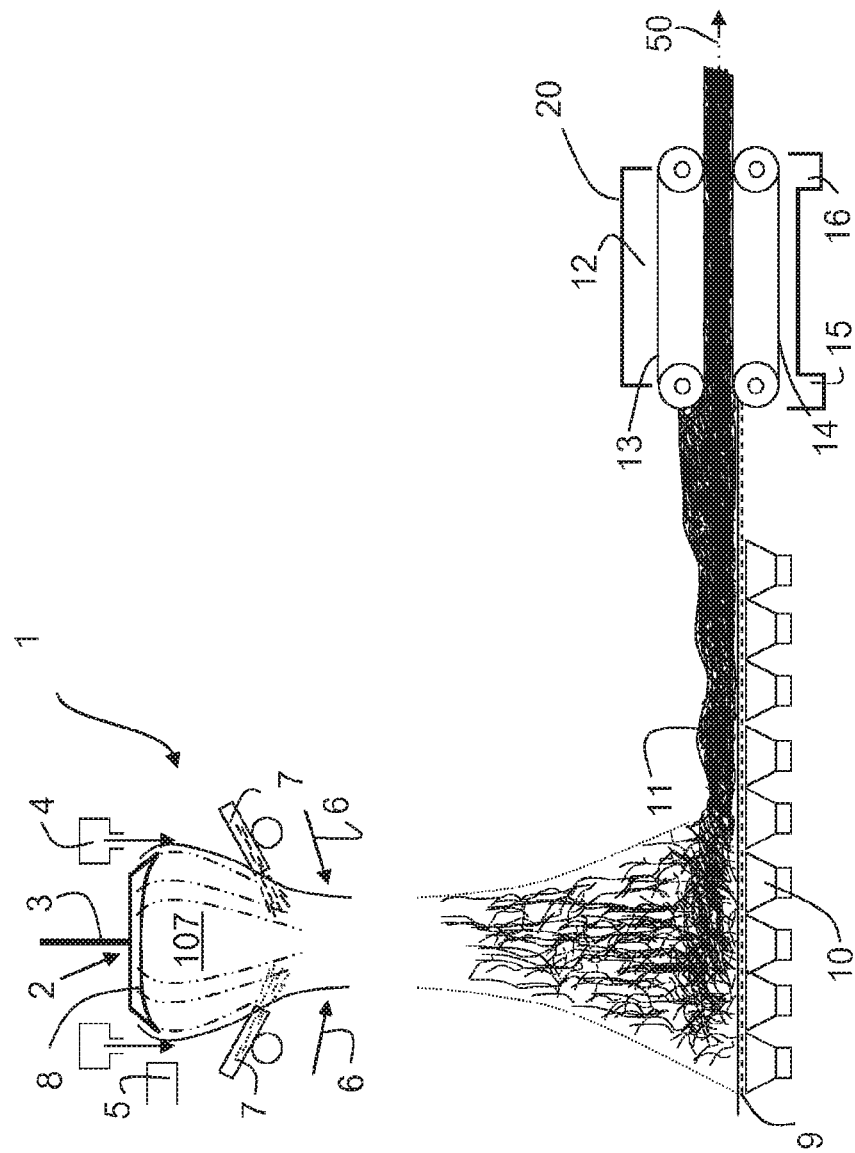

As represented in FIG. 1, a production line for insulating panels based on glass wool comprises a fibering unit 1 entirely known per se, for example corresponding to the method of fibering by internal centrifugation, exemplary embodiments of which are described in the applications EP 0 406 107 or EP 0 461 995. The fibering unit comprises a hood (not represented in FIG. 1), on top of which there is at least one centrifuger 2. Each centrifuger comprises a receptacle (not represented in FIG. 1) for recovering a thread of previously melted fibering glass and a dish-shaped piece 8 whose profile wall is provided with a large number of orifices. During operation, the molten glass, formed into a thread 3 from a melting furnace (not represented) and firstly recovered in the centrifuger receptacle escapes through the orifices of the dish 8 in the form of a multitude of filaments set in rotation. The centrifuger 2 is furthermore surrounded by an annular burner 4 which creates, at the periphery of the wall of the centrifuge, a gas flow at high speed and at a sufficiently high temperature to draw the glass filaments into fibers in the form of a veil 107. The fibering according to this method is integral, and produces 100% usable fibers. The method furthermore ensures long and flexible fibers.

Heating means 5, for example of the inductor type, are used to keep the glass and the centrifuger at the correct temperature. The veil 107 is enclosed by a gas flow of air introduced under pressure, schematized by the arrows 6. The torus 107 is surrounded by a device for spraying a bonding agent containing a thermally curable binder in aqueous solution, only two elements 7 of which are represented in FIG. 1.

The bottom of the fibering hood consists of a device for receiving fibers, comprising a conveyor incorporating an endless belt 9 which is permeable to gases and water, under which compartments 10 are arranged for receiving gases, such as air, the fumes and the excess aqueous compositions coming from the fibering process described above. A mat 11 of glass wool fibers mixed intimately with the bonding composition is thus formed on the belt 9 of the conveyor. The mat 11 is transported by the conveyor to an oven 12 for crosslinking the thermally curable binder.

Figure 2:
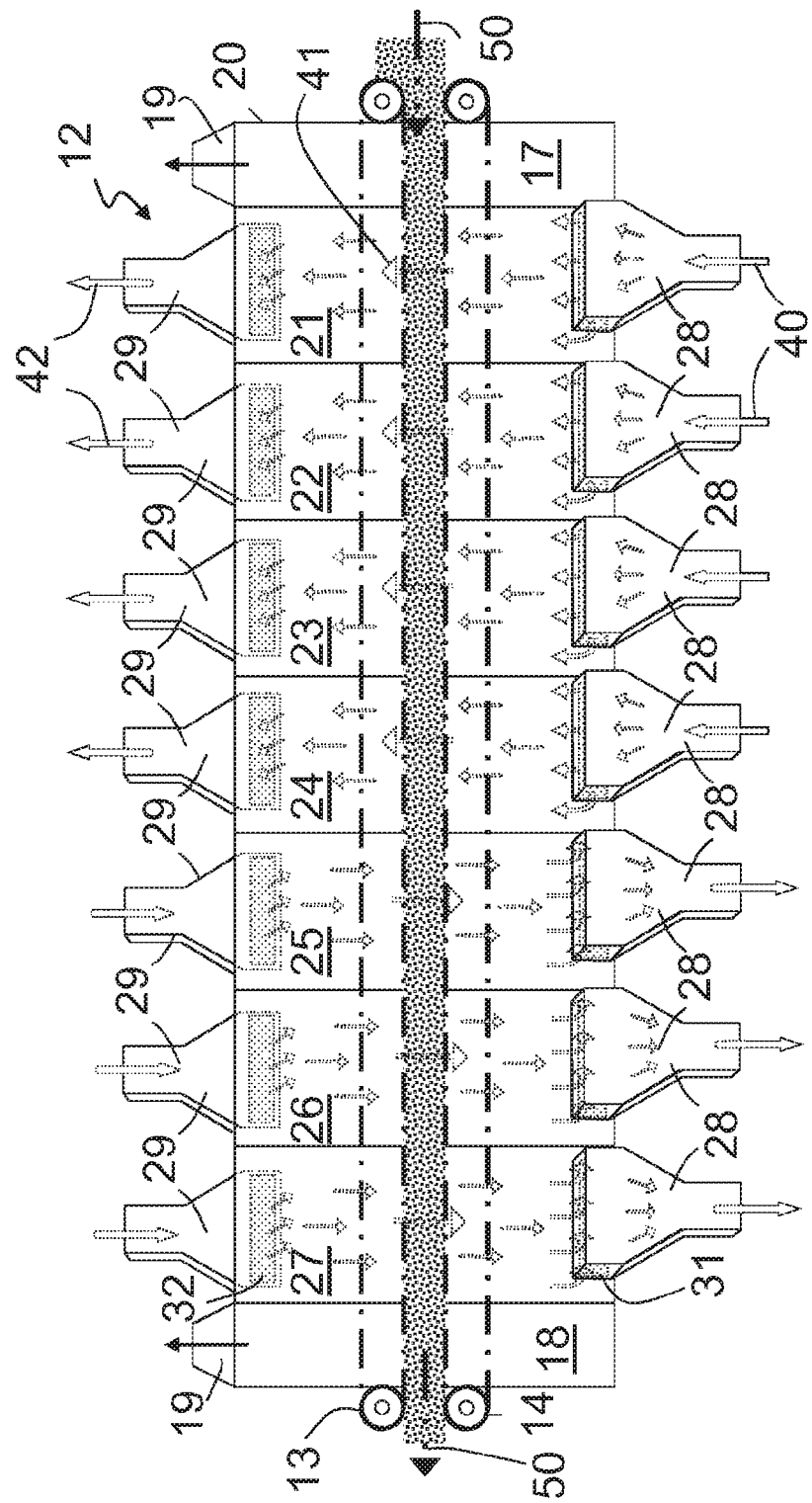

As represented in FIGS. 1 and 2, this oven 12 is surrounded by a closed housing 20 delimiting entry 17 and exit 18 ports and a series of compartments 21-27 separated by one another by walls and individually supplied by burners with hot air circulated by fans (not represented in FIGS. 1 and 2). Two conveyors 13, 14 for transporting and calibrating the mat 11 pass through the housing. These conveyors 13, 14 are for example set in rotation by motors placed on the floor (15, 16 in FIG. 1), and consist in a well-known manner of a succession of pallets formed by mutually articulated grilles which are perforated in order to be permeable to gases.

While ensuring passage of the hot gases so as to promote rapid setting of the binder, the conveyors 13, 14 compress the mat 11 in order to give it the desired thickness. By way of example, for a rolled panel, this typically lies between 10 and 450 mm, the density of the glass wool layer lying for example between 5 and 150 kg/m$^3$. Distinction is thus made, for example, between so-called low-density products, for which the density varies between 5 and 20 kg/m$^3$, and so-called high-density products, in which the density varies between 20 and 150 kg/m$^3$.

FIG. 2 describes the structure of the crosslinking oven 12 in more detail. The oven represented in FIG. 2, although not to be considered as limiting the scope of the present invention, comprises seven compartments 21-27, the detail of which is illustrated in more detail in the subsequent figures, in addition to the entry and exit 18 ports.

The entry and exit ports open onto fume extraction hoods 19 (the extraction direction of which is represented in FIG. 2 by solid black arrows), these hoods being connected to a circuit (not represented in the figures) provided for processing said fumes.

In the first port 17, the entry port, the hot air introduced into the mat makes it possible to vaporize the water which is present. After it has passed through the mat, the air laden with moisture is extracted through the fume extraction hood 19.

In the figures, the circulation of the air in the oven is represented by dotted arrows 40. The direction of movement of the mat is indicated by the arrows 50.

In the first compartments, for example compartments 21-24, the hot air is introduced through the bottom of the oven and extracted through the top, after it has passed through the mat. The use of a plurality of compartments permits a progressive temperature rise of the fiber mat to a temperature higher than the curing temperature of the binder present on the fibers of the mat.

In the subsequent compartments, for example compartments 25-27, the hot air is this time introduced through the top of the oven and extracted from the bottom.

The additional fumes generated in the compartments are finally extracted in the exit port 19, via the hood 19.

The mechanical properties of the final product depend on the control of the temperature in the various compartments, particularly if a green binder is used, as indicated above.

Figure 3:
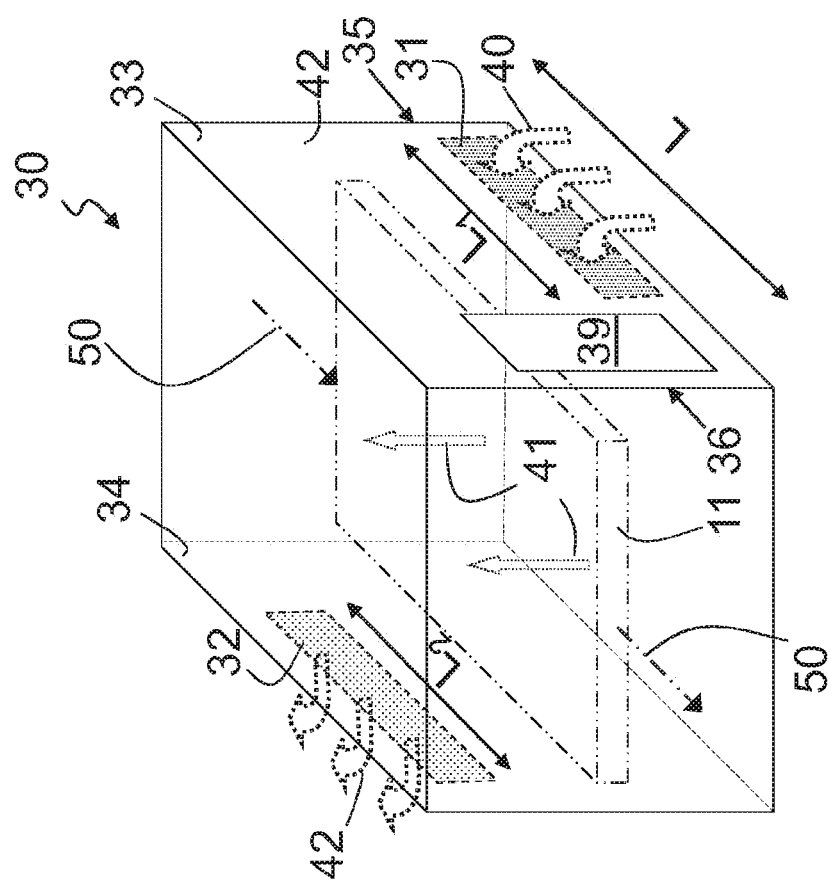

FIG. 3 schematically represents a compartment 30 in more detail.

On the compartment 30 represented in FIG. 3, for greater clarity, the air inlet 28 and outlet 29 conduits have not been represented. Only the openings 31 and 32 formed on the side of the compartment, on which the hot air inlet conduits and the outlet conduits for air after it has passed through the fiber mat open, are represented.

In the sense of the present description, an "opening" means a single opening over the entire length in question, or a series of openings for slots which are close together and respectively separated by reinforcing segments (not represented in the figures).

FIG. 3 represents a conventional configuration of a compartment 30 and its system for supplying hot air and extracting the air after it has passed through the mattress 11. The hot air is introduced at the openings 31 according to the arrows 40 arranged on a first side 33 of the compartment, with reference to the direction of movement 50 of the mat, defining the length L of transit of the mat along the compartment. The hot air, as schematized by the arrows 41, subsequently passes through the perforated conveyors (not represented in FIG. 3) and the fiber mat 11 in order to progressively increase the temperature inside the latter. After passing through, the air is subsequently recycled and extracted through openings 32 (as symbolized by arrows 42) formed on the opposite side 34 of the compartment. The openings 31 and 32 cover lengths $L_1$ and $L_2$ conventionally lying, for example, between 20 and 70% of the length L of the compartment. According to the embodiment illustrated by FIG. 3, which is given by way of comparison, the gas inlet opening 31 extends substantially from a first end 35 of the compartment to the other end 36 of the compartment, over a portion of length $L_1$ of the order of ⅔ of the total length L of the compartment in the direction of movement of the fiber mat. The gas outlet opening 32 extends approximately from the other end 36 of the compartment toward said first end 35 of the compartment, over a portion of length $L_2$ also of the order of ⅔ of the total length L of the compartment. An access door 39 to the compartment 30 is also provided over the length portion not comprising an opening, and can be used for maintenance and cleaning the latter and the conveyors.

Figure 4:
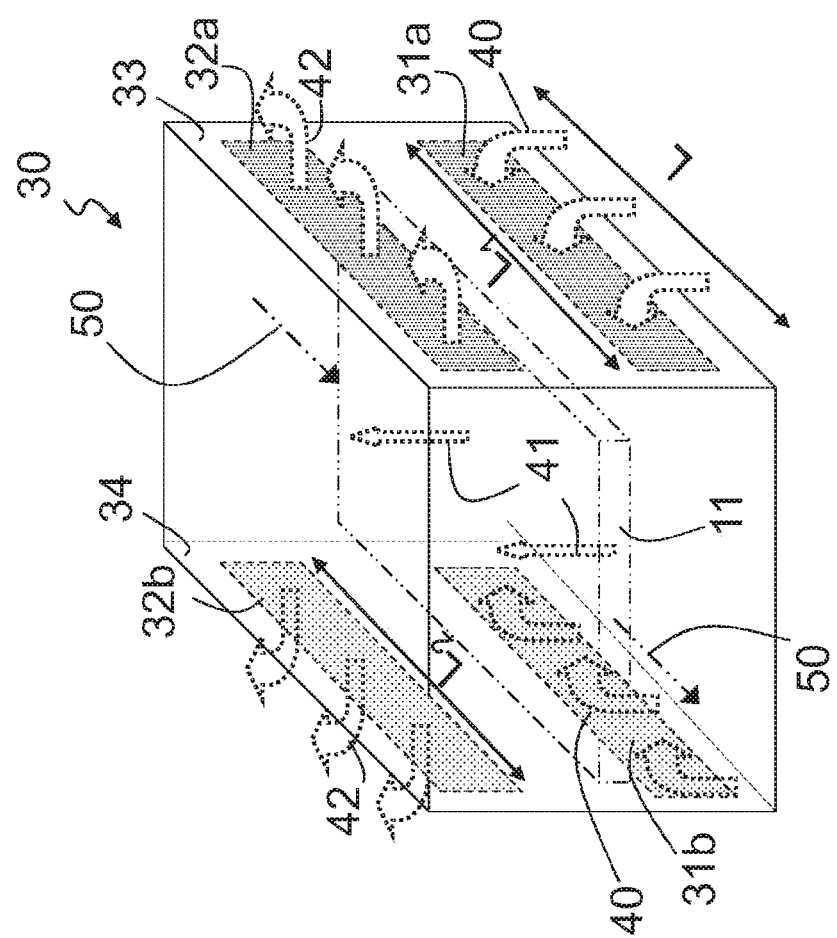

FIG. 4 in turn represents a compartment 30 according to the subject-matter of the present invention, according to a first embodiment. In all the figures, the same numbers denote the same elements, or substantially the same elements, without there being a need to repeat their meanings again. According to the present invention, in the compartment 30, the air inlets open partly on openings 31 formed on a first lateral side 33 and partly on the opposite lateral side 34 of said compartment. In the figures, 31*a* denotes the openings on the first side and 31*b* denotes the openings on the opposite side. The gas inlet openings 31 (31*a* and 31*b*) extend substantially over a length $L_1$ from a first end 35 of the compartment toward the other end 36 of the compartment, over the majority, for example more than 70% or even more than 80%, of the total length L of the compartment. The hot air 40 is in this case introduced through the two sides 33 and 34 of the compartment, below the fiber mat 11, passes through it (arrows 41) then is extracted (arrows 42) in the upper part of the compartment through the openings 32 (32a and 32b) which are arranged above the openings 31 and cover substantially the same surface area ($L_1 \approx L_2$). According to this first embodiment, the openings 31 and 32 are centered on the center of the oven.

Figure 5:
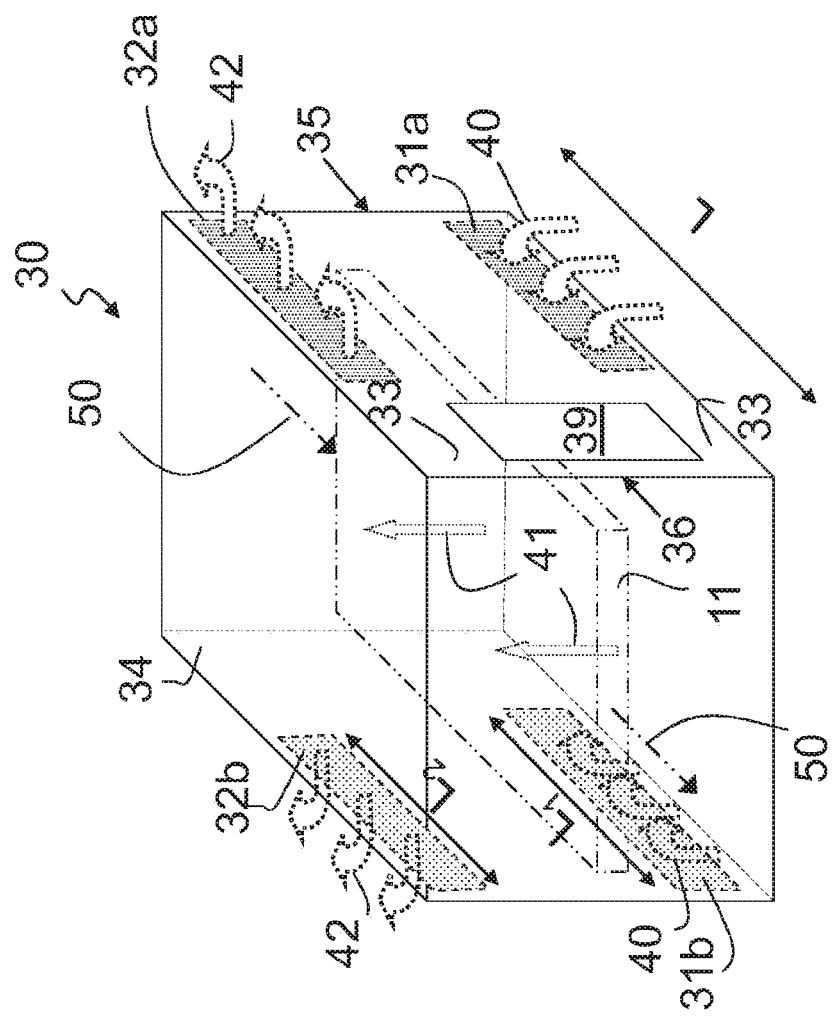

FIG. 5 represents a compartment 30 according to a second embodiment according to the present invention. This configuration differs from the one described above in connection with FIG. 4 by the different arrangement of the openings 31 and 32. The air inlet openings 31a and 31b respectively present on the lateral sides 33 and 34 of the compartments are in this case offset with respect to one another: on the first side 33, the openings 31a extend from a first end 35 toward the opposite end 36, while on the second side 34 the openings 31b extend in this case from the end 36 toward the end 35. As explained with reference to FIG. 1, according to this embodiment the openings 31 and 32 cover only a part $L_1$ of the total length L of the compartment of the order of 50 to 80%, for example about ⅔ of the length L. According to this configuration, in the central part of the oven and along the direction given by the length L there is therefore an overlap zone between the opposite openings 31a and 31b, in which the air flows meet one another. This zone represents, for example, between 5 and 30% of the length L.

On each side, the openings 32 are formed directly above the openings 31, that is to say the opening (or the series of openings) 31a is arranged above the opening (or the series of openings) 32a on the lateral side 33, and the opening 31b is arranged above the opening 32b on the lateral side 34). On a given side, the openings 31 and 32 therefore do not have an offset along the length L and cover substantially the same surface area ($L_1 \approx L_2$). During operation, the hot air 40 is introduced under the fiber mat 11 through the two sides of the compartment via the openings 31a and 31b, passes through it (cf. arrows 41) then is extracted (cf. arrows 42) in the upper part of the compartment, through the openings 32a and 32b.

Just like the configuration described above with reference to FIG. 1, such an embodiment has the advantage of permitting the presence of an access door 39 to the compartment 30, which can be used for maintenance and cleaning the latter.

Figure 6:
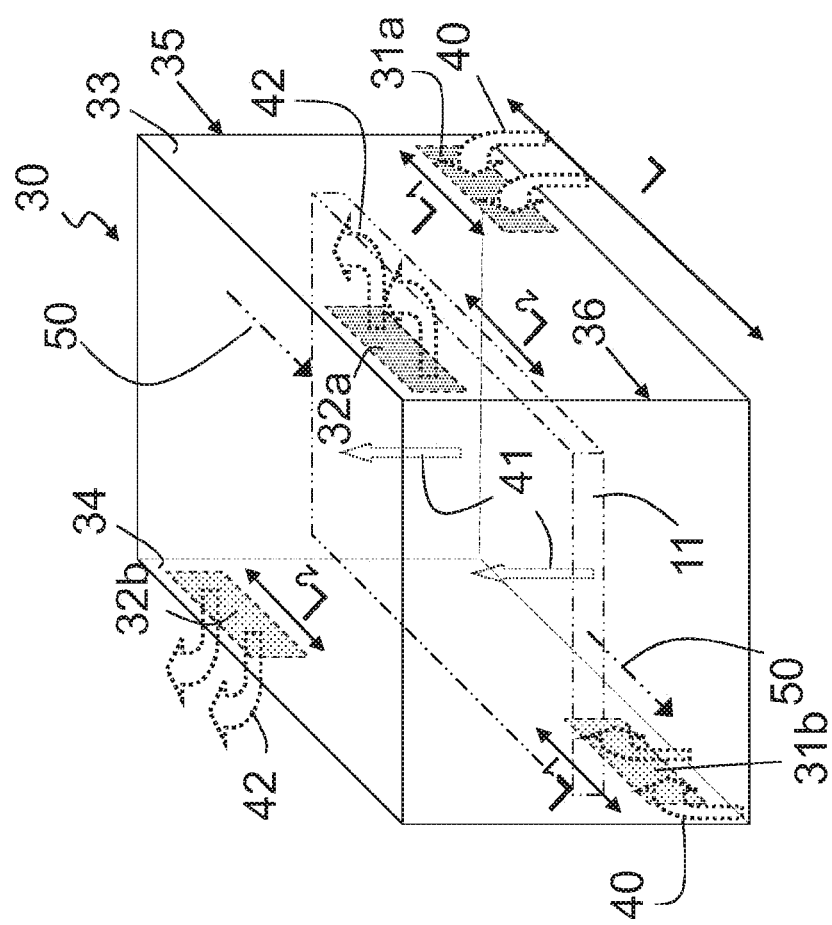

FIG. 6 represents a compartment 30 according to a third preferred embodiment according to the present invention. This configuration differs from the one described above in connection with FIGS. 4 and 5 by an alternative arrangement of the openings 31 and 32. The air inlet openings 31a and 31b arranged on each side, respectively 33 and 34, are in this case offset with respect to one another along the direction given by the length L. A first opening 31a is arranged on the first side 33 from the first end 35 of the length of the compartment toward the center of the compartment, over a portion $L_1$ of less than 70% and preferably less than 60%, or even less than 50% of the length L. As represented in FIG. 6, the air inlets 31a and 31b on each of the respective faces 33 and 34 do not face one another but are offset with respect to one another, each extending respectively from a first end or from the opposite end 36 toward the center of the compartment 30. According to the preferred configuration represented in FIG. 2, in which $L_1$ and $L_2$ are less than 50% of the length L, there is no overlap between the openings 31a and 31b in the central region of the compartment. Without departing from the scope of the invention, the openings 31a and 31b may also extend beyond the center of the compartment, in which case an overlap zone is obtained between the air flow coming from the opening 31a and the air flow coming from the opening 31b. This zone represents, for example, between 5 and 30% of the length L. Such a configuration may advantageously be used with a view to homogenizing the air flows coming from the two air inlets.

According to this embodiment, according to the same principle, the openings for the air outlets 32a and 32b on each of the respective faces 33 and 34 do not face one another but are offset with respect to one another in the same way as explained above. Thus, the air outlets 32 (32a and 32b) are not, on a given side, arranged directly above the air inlet openings 31 (respectively 31a and 31b) but are also offset with respect to the latter. In this way, a compartment is ultimately obtained in which both respectively the openings 31a and 31b for the air inlets and the openings 32a and 32b for the air outlets do not face one another but are offset with respect to one another along the direction of movement of the mat.

Examples are given by way of illustration and in order to assess the performance of the various embodiments explained above and compare them with current oven systems.

More precisely, in the examples which follow, modeling of these various embodiments was carried out on a single compartment having one of the configurations above. The conditions of the simulation and the results obtained are given below:

In order to carry out this comparative study, an aeraulic model for studying the hot air flows inside a compartment as described above was used on the basis of the following assumptions and approximations:

The heat exchanges inside the mat are taken into account through a source term which models the heat loss overall. The temperature difference between the upper and lower parts of the mat is adjusted by means of this source term.

An absence of inertia of the components is assumed (no heating of the belts, conveyors, metal sheets, etc.).

The hot gases of the oven are likened to hot air, the air being considered as an ideal gas.

The permeability of the product is assumed to be isotropic, and the leakage regions between the pallets are modeled with the aid of a porous medium, the permeability of which is varied in order to obtain the level of leaks.

The heat losses at the walls are not taken into account.

Although this model may be considered as approximate in relation to the heat exchanges between the mat and the hot gases which flow in the model compartment, it has sufficient accuracy for analyzing the distribution of the pressure over the upper and lower faces of the mat in relative terms. In particular, it makes it possible to analyze the relative differences in the distribution of speed when passing through the mat for the various configurations described above with reference to appended FIGS. 3 to 6.

Furthermore, the simulations are carried out with a constant set flow rate and with constant permeability of the mat, which allows the pressure drop generated in the oven to be visualized directly and compared between the various configurations. The pressure drop is directly related to the energy consumption of the installation.

The following parameters are used for the simulations:

The simulations employ the Fluent software, used in steady state. The solver used is based on the pressure, according to a decoupled algorithm of the "SIMPLE" type.

A single-species air flow likened to an ideal gas with variable thermodynamics is assumed, with λ (thermal conductivity), $c_p$ (specific heat) and μ (viscosity) being functions of temperature.

The turbulence is modeled by the k-w SST model provided by the Fluent® software.

The following boundary conditions were set:

For the hot air inlets at the exit of the fan:

Total air flow rate set: 5 kg/s

Total temperature: 235° C.

The gases of the burner are likened to hot air.

As regards the glass wool mat:

Permeability K of the mat for air, the "perpendicular" index meaning that it is measured through the thickness of the product and the "parallel" index indicating that it is measured in the plane of the glass wool mat:

a) for a product of higher density (density more than 20 kg/m³): $K_\perp = K_{81} = 2.10^{-9}$ m² b) for a product of lower density (density less than 20 kg/m³): $K_\perp = K_\parallel = 1.10^{-8}$ m².

Thickness: 100 mm,

Heat losses: ΔT=30° C.,

Speed of movement: 0.18 m/s.

As regards the perforated grilles:

High transverse permeability: the pressure drop generated by the flow through the grilles is assumed to be negligible compared with the pressure drop generated in the mat.

Low longitudinal permeability: the longitudinal permeability is 10 times less than in the mat.

The heat losses of the walls of the oven are neglected.

The width of the openings is equal to 12% of the total height of the compartment.

The performance evaluation between the various configurations is made possible by comparing the different values finally obtained for:

The pressure drop generated in the ventilation ducts, during passage through the compartment and the fiber mat, The homogeneity of the distribution of the average vertical passage speed through the fiber mat. This homogeneity is measured by calculating the variance of said vertical speed over the width of the fiber mat and integrated over its entire length.

Table 1 below summarizes all the results found for the various configurations simulated in connection with FIGS. 3 to 6.

TABLE 1

| Example | Example 1 | Example 2 | Example 3 | Example 4 |
|---|---|---|---|---|
| Illustration | FIG. 3 (comp.) | FIG. 4 | FIG. 5 | FIG. 6 |
| Length of opening(s) | $L_1 = L_2 =$ 0.67 L | $L_1 = L_2 =$ 0.86 L | $L_1 = L_2 =$ 0.67 L | $L_1 = L_2 =$ 0.47 L |
| Configuration of openings | 1 inlet (31) 1 outlet (32) | 2 inlets (31a-31b) 2 outlets (32a-32b) | 2 inlets (31a and 31b) 2 outlets (32a and 32b) | 2 inlets (31a and 31b) 2 outlets (32a and 32b) |
| Offset of the openings along the length L | Offset between inlet 31 and outlet 32 | No offset | Inlets 31a and 31b offset No offset between inlets 31a (31b) and outlets 32a | Inlets 31a and 31b offset Offset between inlets 31a (31b) and outlets 32a |
| | | | (32b) | (32b) |
| Mat of lower-density (7 kg/m³) | | | | |
| Pressure drop ΔP (pascals) | 212 | 179 | 135 | 110 |
| Average vertical speed (m/s) | 0.229 | 0.227 | 0.218 | 0.227 |
| Speed standard deviation ($10^{-3}$ m/s) | 3.0 | −1.7 | 1.0 | 0.6 |
| Mat of higher density (28 kg/m³) | | | | |
| Pressure drop ΔP (pascals) | 258 | 225 | 186 | 154 |
| Average vertical speed (m/s) | 0.096 | 0.095 | 0.096 | 0.096 |
| Speed standard deviation ($10^{-3}$ m/s) | 0.4 | −0.3 | 0.2 | 0.1 |

Figure 7:
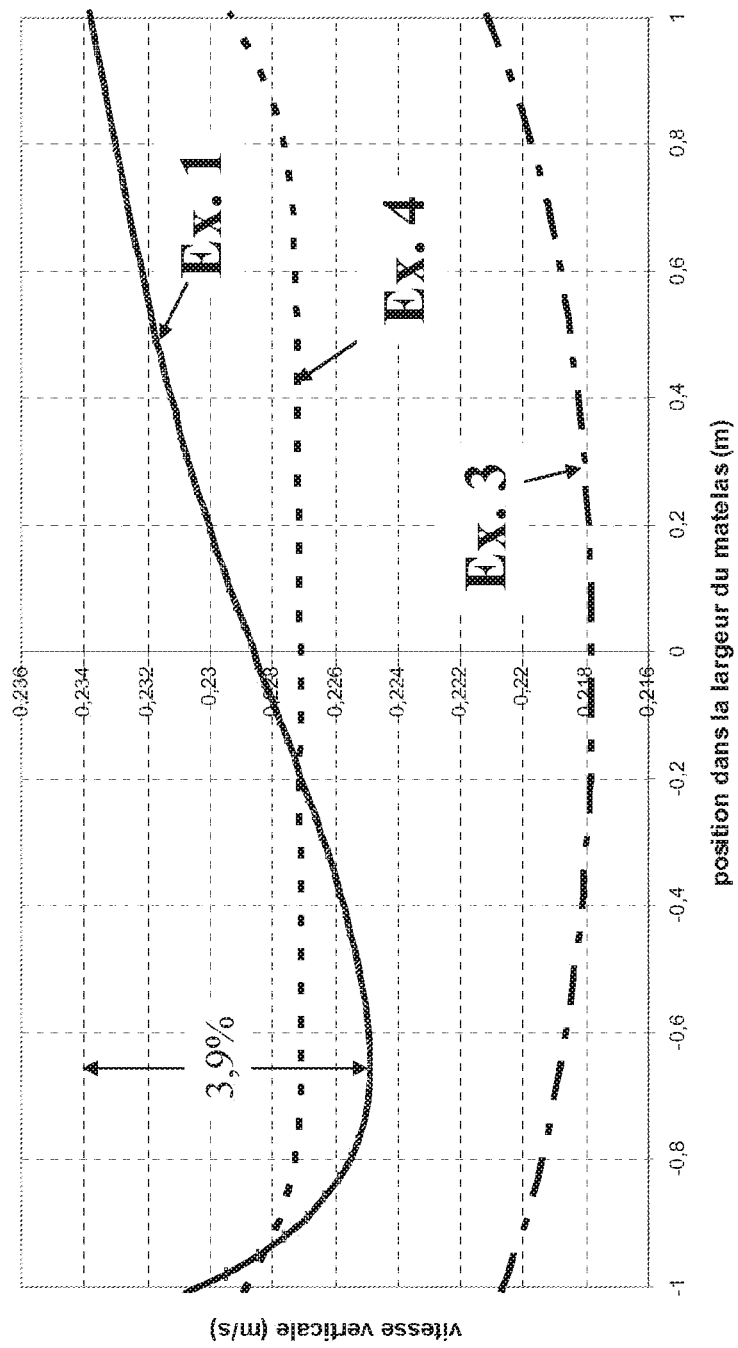
FIG. 7 shows a graph of vertical speed versus position in the width of the mat according to an embodiment of the invention.
Figure 8:
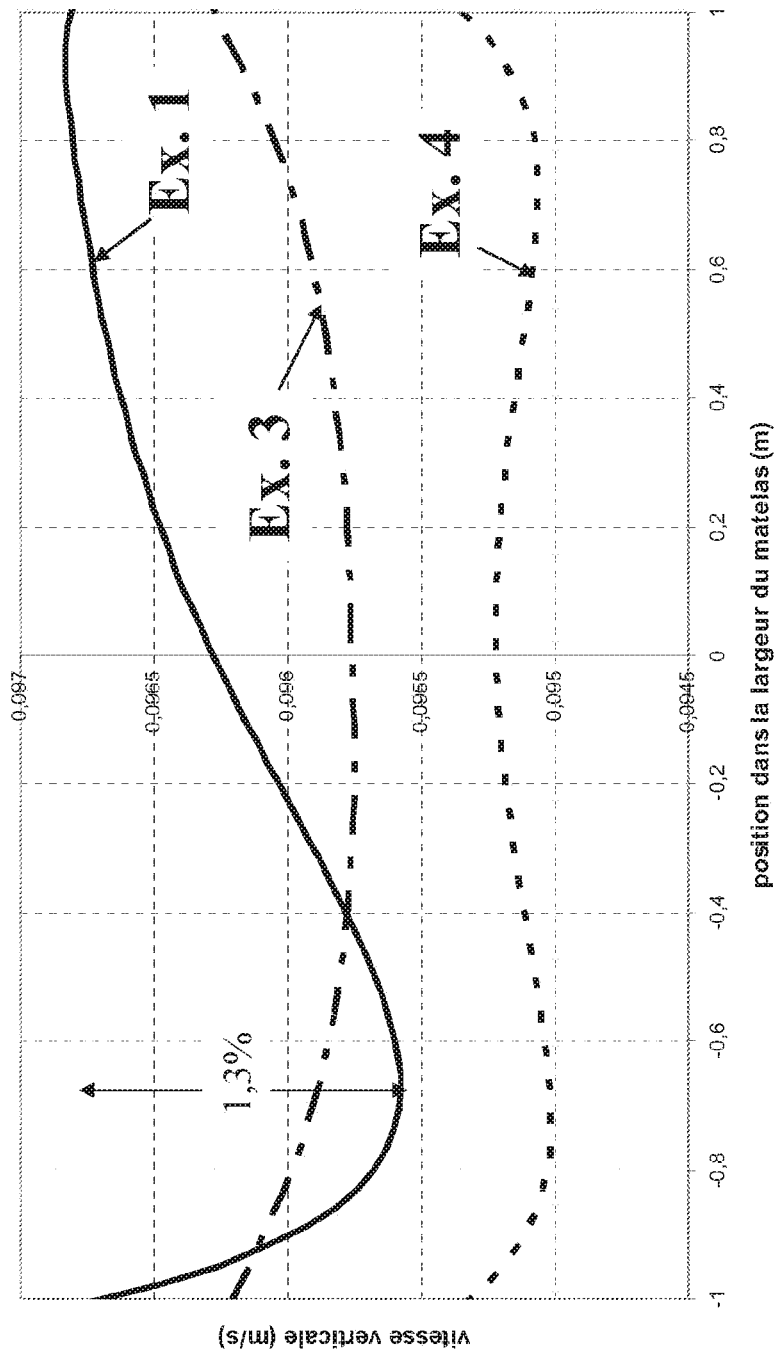
FIG. 8 shows a graph of vertical speed versus position in the width of the mat according to a further embodiment of the invention.

Appended FIGS. 7 and 8 report the vertical speed profiles over the width of the fiber mat which are obtained for Examples 1 (comparative), 3 and 4, integrated over the entire length of the compartment, in the case of the fiber mat of lower density (FIG. 7) and in the case of the fiber mat of higher density (FIG. 8).

The following comments are made:

$1^{st}$) As regards the results obtained with the mat of lower density:

The results reported in Table 1 indicate a substantial decrease in the pressure drop ΔP generated in the ventilation ducts for all the various configurations according to the invention, compared with the reference configuration (Example 1 illustrated by FIG. 3), in which the hot air supply is carried out on only one side of the compartment More particularly, the configuration according to Example 4 (illustrated by FIG. 6) proves particularly advantageous, since a decrease in the pressure drop by a factor almost equal to 2 is observed, for low-density products.

For the configuration according to Example 2, the decrease in the pressure drop is quite significant, but less pronounced than that obtained for the configuration according to Example 4.

An improvement in the pressure drop is also measured for the configurations according to Example 3, albeit more limited.

Furthermore, an improvement of the order of 80% in the standard deviation of the vertical speed is observed to Example 4 when the speed profiles are integrated along the direction of movement of the product, that is to say over the length of the oven.

As represented in FIG. 7, according to the configuration of comparative Example 1, a difference of 3.9% can be calculated between the speed minimum and maximum with a very great left/right disparity (obviating edge effects). It should be noted that such a difference is of the order of that which is actually observed in such a compartment equipping an oven on production lines).

According to the configuration according to the invention, it is seen that this difference can be brought to a value of less than 1% with a very small disparity between the right side and the left side of the mat.

$2^{nd}$) As regards the results obtained with the mat of lower density:

The trends observed are the same as those described above for the product of low-density. A slightly less significant improvement in the pressure drop is observed. The homogeneity of the vertical passage speeds is also improved (cf. FIG. 8), although the left/right disparities obtained for the reference configuration are less critical for the denser product.

In conclusion, the simulation tests unequivocally indicate that the configurations according to the present invention, in particular the configurations according to Examples 2 and 4, and more particularly the configuration of Example 4, perform better than the comparative configuration considered as representative of the prior art.

For the low-density products, supply of the two sides according to the invention makes it possible to homogenize the left/right speed distribution, which allows better regulation of the temperature "seen" by the binder at any point in the fiber mat, and consequently makes it possible to improve the baking quality of the product and thus its final properties.

Furthermore, implementation of the invention also leads to a consequent decrease in the pressure drop, which will specifically be manifested by an increase in the capacity of the oven and/or energy efficiency gains.

For the high-density products, the improvement in the homogeneity of the speed is also observed, albeit less significant, the resistance to the passage of air by the mat making it possible to homogenize the speed field if the latter is initially very heterogeneous. A significant gain in the pressure drop, of the order of 40%, is also observed.

In the embodiments and examples above, the openings for the hot air inlets were represented below the fiber mat, so that the air flow passing through the latter is upward, the openings for the air outlets being arranged in the upper part of the compartment. Quite clearly, if the openings for the hot air inlet were arranged above the fiber mat, so that the air flow passing through the latter is downward, the openings for the air outlets then being arranged in the lower part of the compartment, this would not depart from the invention.

Without departing from the scope of the invention, the oven according to the invention may comprise only the improved compartments described above. Alternatively, the oven according to the invention may comprise improved compartments and compartments according to the prior art equipped with openings on only one side. In particular, the improved compartments according to the invention may be positioned in the oven only at the positions where the curing of the binder is carried out, the improved control of the temperature and of the homogeneity of the passage speeds through the mat then being paramount.

The invention claimed is:

1. A method for manufacturing a mat of mineral wool fibers the method comprising:
providing an oven for baking a thermally curable binder present in a mat of mineral fibers, the oven comprising:
a plurality of compartments through which a mat of fibers can successively pass in a direction of movement of the mat, each compartment including a top wall, a bottom wall, a first lateral side wall and a second lateral side wall that is opposite the first lateral side wall, each compartment having a length L along the direction of movement of the mat;
a gas-permeable upper conveyor and a gas-permeable lower conveyor;
means for introducing a hot air flow, which means is located either below or above the fiber mat; and
means for extracting the air, the means for extracting arranged either above or below the fiber mat and opposite the means for introducing so that the fiber mat is positioned between the means for extracting and the means for introducing;
wherein at least one of the compartments includes the means for introducing a hot air flow, the means for introducing a hot air flow including an air inlet opening formed on the first lateral side wall of the at least one compartment and an air inlet opening formed on the second lateral side wall of the at least one compartment;
forming mineral wool fibers,
spraying a solution of the thermally curable binder onto the mineral wool fibers,
forming the mat from the mineral wool fibers such that the binder is present in the mat,
passing the mat through the oven to heat and cure the binder, wherein passing the mat through the oven comprises:
passing the mat through the plurality of compartments in the direction of the movement of the mat,
compressing the mat between the gas-permeable upper conveyor and the gas-permeable lower conveyor,
transporting the mat through the compartments with the gas-permeable upper conveyor and the gas-permeable lower conveyor,
introducing a hot air flow with the means for introducing a hot air flow;
extracting the hot air with the means for extracting the air such that the hot air is caused to pass through the mat, and so that the binder is progressively brought to a temperature higher than its curing temperature.

2. The method as claimed in claim 1, wherein the at least one compartment includes the means for extracting the air after the air has passed through the mat, the means for extracting comprising an air outlet opening formed on the first lateral side wall and an air outlet opening formed on the second lateral side wall of the at least one compartment.

3. The method as claimed in claim 2, wherein the air inlet opening and the air outlet opening on the first lateral side wall and the air inlet opening and the air outlet opening on the second lateral side wall are positioned such that none of the openings face each other across a width of the at least one compartment along the direction given by the length L of the at least one compartment.

4. The method as claimed in claim 1, wherein the means for introducing a hot air flow includes a plurality of air inlet openings formed on the first lateral side wall of the at least one compartment and a plurality of air inlet openings formed on the second lateral side wall of the at least one compartment, and along the direction given by the length L of the at least one compartment, the openings formed for the air inlets on the first lateral side wall are arranged substantially facing the openings formed for the air inlets on the second lateral side wall.

5. The method as claimed in claim 1, wherein the air inlet opening formed on the first lateral side wall and the air inlet opening formed on the second lateral side wall are offset so as to not face each other across a width of the at least one compartment along the direction given by the length L of the at least one compartment.

6. The method as claimed in claim 5, wherein the means for introducing a hot air flow includes a plurality of air inlet openings formed on the first lateral side wall of the at least one compartment and a plurality of air inlet openings formed on the second lateral side wall of the at least one compartment, and along the direction given by the length L of the at least one compartment, the openings on the first lateral side wall and the openings on the second lateral side wall have an overlap region of between 5 and 30% of the length L.

7. The method as claimed in claim 1, wherein the means for introducing a hot air flow includes a plurality of air inlet openings formed on the first lateral side wall of the at least one compartment and a plurality of air inlet openings formed on the second lateral side wall of the at least one compartment, and along the direction given by the length L of the at least one compartment, the openings formed for the air inlets on the first lateral side wall and second lateral side wall are offset and are arranged:

on the first lateral side wall: from a first end of the length of the at least one compartment toward the opposite end of the compartment, over a portion having a length of less than 80% of the length of the at least one compartment, on the second lateral side wall: from the opposite end of the length of the at least one compartment toward the first end, over a portion having a length of less than 80% of the length of the at least one compartment.

8. The method as claimed in claim 7, wherein:

along the direction given by the length L of the at least one compartment, the openings formed on the first lateral side wall extend from a first end to the center of the at least one compartment, and wherein the openings formed on the second lateral side wall extend from the opposite end to the center of the at least one compartment.

9. The method as claimed in claim 1, wherein;

the means for introducing a hot air flow includes a plurality of air inlet openings formed on the first lateral side wall of the at least one compartment and a plurality of air inlet openings formed on the second lateral side wall of the at least one compartment, and along the direction given by the length L of the at least one compartment, the means for extracting air is arranged above all of the air inlet openings.

10. The method as claimed in claim 1, wherein the means for introducing a hot air flow includes a plurality of air inlet openings formed on the first lateral side wall of the at least one compartment and a plurality of air inlet openings formed on the second lateral side wall of the at least one compartment, the means for extracting the air includes a plurality of air outlet openings formed on the first lateral side wall of the at least one compartment and a plurality of air outlet openings formed on the second lateral side wall of the at least one compartment, and along the direction given by the length L of the at least one compartment, the air outlet openings formed on the first lateral side wall are offset from the air inlet openings on both the first and second lateral side walls and the air outlet openings on the second lateral side wall are offset from the air inlet openings on both the first and second lateral side walls.

11. The method as claimed in claim 1, wherein the binder is obtained from a plant source.

12. The method as claimed in claim 11, wherein the introduced hot air flow has a temperature between 200° C. and 250° C.

13. The method as claimed in claim 1, wherein the introduced hot air flow has a temperature between 200° C. and 250° C.

* * * * *